July 23, 1968  E. KLEINSCHMIDT  3,393,553

APPARATUS FOR MEASURING VISCOSITY

Filed Feb. 7, 1966

Ernst Kleinschmidt,
INVENTOR.

BY 3,393,553
APPARATUS FOR MEASURING VISCOSITY
Ernst Kleinschmidt, Schilden, near Cologne, Germany, assignor to Herbig-Haarhaus Aktiengesellschaft Cologne, Bickendorf, Cologne, Germany
Filed Feb. 7, 1966, Ser. No. 525,556
Claims priority, application Germany, Sept. 16, 1965, H 57,196
3 Claims. (Cl. 73—54)

ABSTRACT OF THE DISCLOSURE

A viscosimeter is provided which operates on the principle of an oscillating or vibrating tongue or reed and includes means for bringing the surrounding liquid to be measured into laminar flow in the vicinity of the reed or tongue to improve viscosity measurements.

Figure 1:
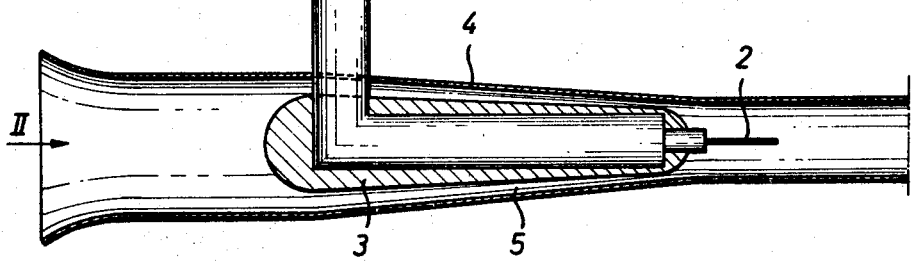

This invention relates to improvements in Apparatus for Measuring Viscosity of reaction mixtures in agitating or mixing vessels.

The measurement of viscosity in chemical reactions is extremely important, as the viscosity of polyesters, alkyd resins, amino or phenolic plastics, for example, is decisive for obtaining the desired properties of these condensation and polymerization products. Consequently, the viscosity should be continuously measured under practical operational conditions when these products are produced in agitating or mixing vessels, as the viscosity constantly changes during the reaction of the starting products and increases as the reaction continues.

For the continuous measuring and recording of the viscosity of reaction mixtures, a viscosimeter is known which operates on the principle of the vibrating reed and which consists substantially of a connection cable and the electric measuring instrument. With this viscosimeter, a metal tongue or reed is located at the lower end of the measuring probe and has one-half consisting of a magnetostrictive alloy and projects into a coil arranged in the probe. The other half, which consists of a stainless, acid resistant steel, is located outside the measuring probe and is immersed into the reaction mixture. The metal reed is excited by a measuring instrument with ultrasonic frequency and is set into vibration.

These vibrations or oscillations cause the interfaces of the surrounding liquid to shear, which results in an attenuation of the magneto-strictly produced vibrations. The degree of attenuation is a function of the viscosity of the liquid to be tested. The changes in the electrical magnitudes in the exciting circuit, which are connected with the attenuation, are indicated with the aid of the electronic measuring instrument.

Difficulties have been encountered in the application of the known viscosimeter in the measurement of the viscosity of reaction mixtures which are set in a turbulent flow by means of an agitator or mixer. In this instance, a jerky deflection through several sections of the scale is observed on the needle of the viscosimeter and this, therefore, impairs the precise measurement of the viscosity of a reaction mixture.

It is the object of the present invention to overcome the difficulties occurring during the application of the known viscosimeter in the measurement of the viscosity of reaction mixtures in agitating or mixing vessels.

This object is achieved by the reaction mixture being brought into a laminar flow in the measuring zone, that is to say, in the vicinity of the metal reed or tongue. This is effected by the lower section of the measuring probe of the viscosimeter, which carries the metal reed, being at right angles and the angular section of the probe and the reed being disposed in a tube which is open on both sides and surrounds the right-angled section of the probe including the reed in both directions and tapers inwards in the direction of flow of the reaction mixture entering into the tube until it reaches the measuring probe, from which point it is cylindrical up to the outlet, and which tube has an inner diameter at the measuring probe determined by the Reynolds number. The tube is funnel-shaped at the inlet point for the reaction mixture.

According to this embodiment of the invention, the thickest part of the angular probe has a conical body, which is convex on the front side and which forms, together with the tube enclosing it, an annular space of almost constant size.

With straight tubes, the Reynolds number has a value of below 2500 for laminar flow. This figure can be calculated from known variables, such as the speed of the liquid in the tube through which it flows, the diameter of the tube and the viscosity of the liquid to be measured. The Reynolds number becomes smaller with a smaller tube diameter and with higher viscosity. The melt viscosity in the production of alkyd resins and polyesters is seldom below 30 centistokes towards the end of the reaction at the normal reaction temperatures of 200–250° C.; it may lie between 50 and 150 centistokes, however, and higher values are also possible.

From this there results a tapering of the tube according to the invention towards the end of the measuring probe. To maintain a laminar flow at the measuring reed, the following measurements are provided by way of example:

With a speed of a flowing liquid in the protective tube of 1.9 m./sec., a viscosity of the liquid of 100 centistokes and a diameter of the tube at the measuring reed of 4 cm., the Reynolds number is, $$Re = \frac{1.9 \times 0.04 \times 10^6}{100} = 780$$

With this Reynolds number, the flow is completely laminar and a simple calculation shows that turbulence first occurs at below 30 centistokes with this tube diameter.

The measurements for the conical casing and the tube are in this example as follows:

(a) conical casing:  Cm.
  initial diameter _____ 5
  end diameter _____ 2
(b) external tube:
  diameter at the inlet of the liquid _____ 7
  diameter at the end of the casing _____ 4

If the viscosity of the liquid to be measured is well below 30 centistokes, the tube must be still further tapered towards the measuring reed or tongue. If the diameter of the protective tube is only in this instance 2.5 cm., then with a viscosity of 20 centistokes a Reynolds number of 2380 is obtained.

Figure 2:
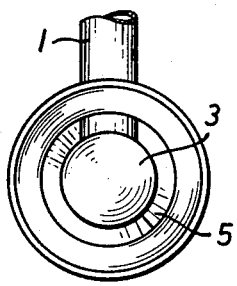

An example of the measuring probe according to the invention is illustrated in the accompanying drawings, wherein:

FIG. 1 is a longitudinal section; and
FIG. 2 is a view of the probe in the direction of the arrow II shown in FIG. 1.

The lower end of the measuring probe indicated by 1 is at right angles. The tongue or reed 2 projects from the front end of the right angled section of the probe 1. The thickest part of the right-angled probe is surrounded by a conical body 3, which is shaped convexly at both ends.

The angular part of the probe, together with the body 3, is located in a long tube 4, which is open at both ends. The probe projects approximately into the first third of this tube 4. The tube, which is funnel-shaped at the inlet of the liquid medium, tapers approximately up to the commencement of the tongue or reed 2, from whereon to the discharge end the tube 4 is cylindrically shaped. The tube projects over the end of the tongue. The annular space 5 located between the tube 4 and the conical body 3 converges gradually towards the tongue.

A liquid, which enters into the tube 4 in a turbulent flow, is converted into a laminar flow by means of the conically tapering tube 4 before it reaches the tongue 2, if the Reynolds number is taken into account, and therefore perfect viscosity measurements can be obtained.

As measuring probes vary in length and thickness at their lower end, the diameter of the tube, according to the invention, must be based on this section of the probe. Good viscosity measurements are obtained for a V4A stainless steel probe of American origin with a diameter of 36 mm., if the tube has a diameter of 65 mm. at the inlet point for the liquid reaction mixture, without taking into account the funnel-shaped widening. The length of the right-angled section of the probe is approximately 210–235 mm., depending on the type of construction of the probe. The conical casing, with these dimensions, has a maximum diameter of approximately 40–50 mm. The liquid to be measured flows through an annular space at the narrowest point between the conical body and the tube. At the narrowest point of the annular space, the tube has a diameter of approximately 7.5–12.5 mm.

While the invention has been illustrated and described in one embodiment, it is recognized that variations and changes may be made therein without departing from the invention set forth in the claims.

I claim:
1. A device for the continuous measurement of the viscosity of liquid reaction mixtures in agitating or mixing vessels, which comprises a viscosimeter operating on the principle of an oscillating or vibrating tongue or reed and including a tubular measuring probe which has two sections at right angles to each other and supports a tongue or reed on the end of one of said sections and a tube which is open at both ends so as to be adapted to have liquid flow therethrough, is funnel shaped at its inlet end, surrounds the said tongue-supporting section of said probe and projects at its exit end over the end of the tongue or reed, said tube having a conical taper in the direction of flow of liquid therethrough substantially to the tongue-supporting end of said probe, said tube having an inner diameter at the tongue-supporting end of said probe such as to cause in the vicinity of said tongue or reed, substantially laminar liquid flow characterized by a Reynolds number of below 2500.

2. A device according to claim 1, further characterized in that the tube surrounding the probe has a cylindrically shaped section substantially from the tongue-supporting end of the probe to the outlet end of the tube.

3. A device according to claim 2, further characterized in that the reed or tongue-supporting section of the probe including its right angled bend is encased in a conical body having a convex face at its upstream end and forming together with the tube which encloses it an annular flow path tapering toward said tongue or reed in the direction of flow of liquid therethrough.

References Cited
UNITED STATES PATENTS 3,043,142  7/1962  Eiland et al. _____ 73—212
3,333,468  8/1967  Jacobs.

OTHER REFERENCES

Bendix Corp. Publication SB311–665 "Ultra Viscoson" (1965), front page, pp. IV, 1–8, (copy in 73–54).

S. CLEMENT SWISHER, *Acting Primary Examiner.*

J. W. ROSKOS, *Assistant Examiner.*